June 13, 1961  E. L. HAGDAHL  2,988,222
DEVICE FOR THE SEPARATION OF SUBSTANCES DISSOLVED IN A LIQUID
Filed March 10, 1958
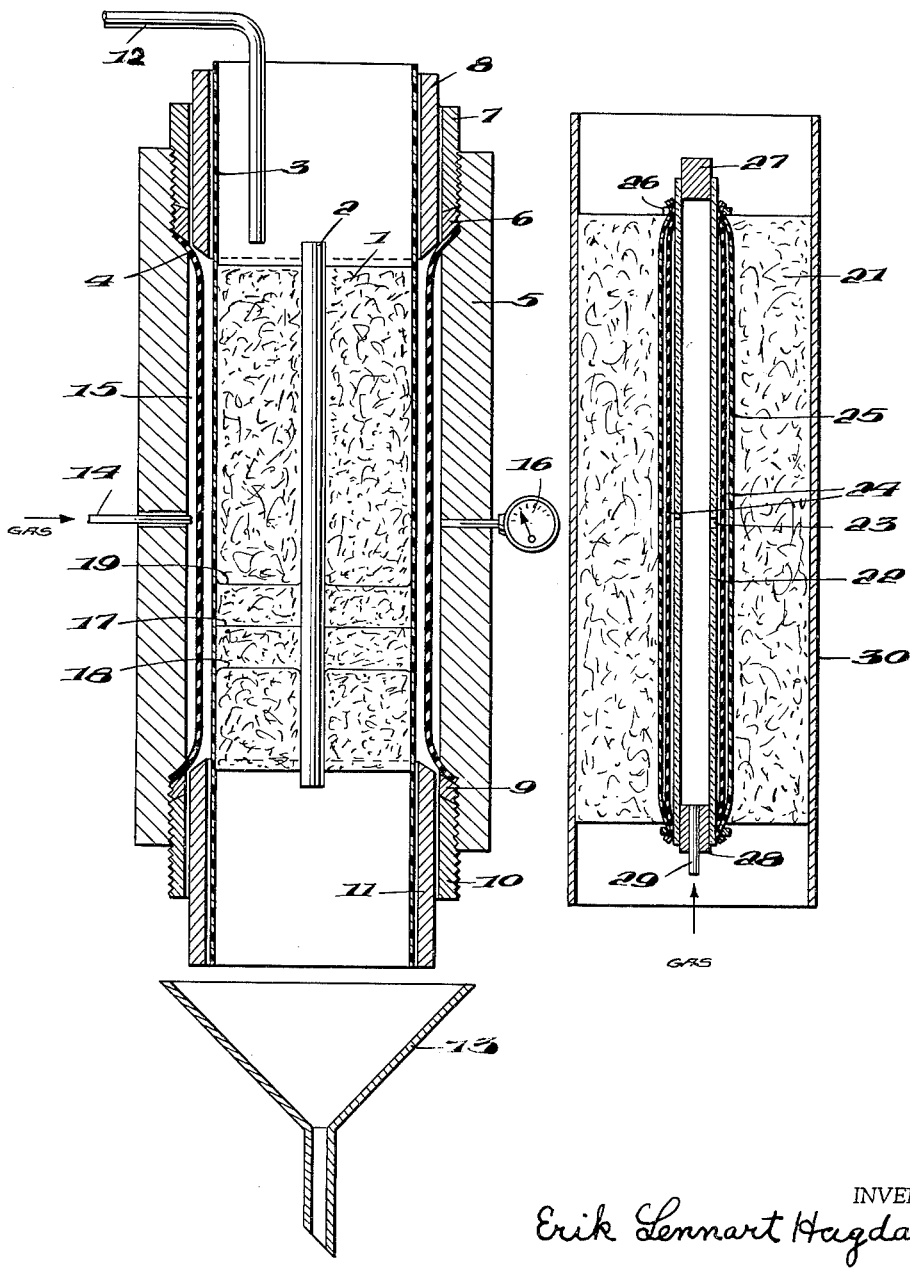
INVENTOR
Erik Lennart Hagdahl
BY Pierce, Scheffler & Parker
ATTORNEYS

United States Patent Office 2,988,222
Patented June 13, 1961

2,988,222
DEVICE FOR THE SEPARATION OF SUBSTANCES DISSOLVED IN A LIQUID
Erik Lennart Hagdahl, Sundbyberg, Sweden, assignor to LKB-Produkter Fabriksaktiebolag, a company of Sweden
Filed Mar. 10, 1958, Ser. No. 720,272
Claims priority, application Sweden Mar. 21, 1957
4 Claims. (Cl. 210—350)

The present invention relates to a device for the separation of substances dissolved in a liquid, more particularly a device in column apparatuses for use in chromatography or electrophoresis.

Such a column apparatus consists of a usually cylindrical column of a sorption agent, said column being arranged in a liquid tight casing.

It is desirable that the sorption agent column has the same porosity throughout. At least, the sorption agent column should be iso-porous in a cross section perpendicular to the direction of flow of the solvent passing through, so that the solvent flows with the same velocity at all points of such a cross section. The iso-porosity is a necessary condition if the solvent is to form a so called straight front, that is, a solvent added at the top surface of the sorption agent column at a certain time must have flowed equally far at all points at an arbitrary later time.

The requirement of such a straight front does not only mean that the porosity inside the sorption agent column proper shall be equal at all points of a cross section perpendicular to the direction of flow, but also that the sorption agent column must snugly fit the surrounding liquid-tight casing so that no zone having a lower flow resistance is formed between the casing and the periphery of the column. The problem of attaining a proper engagement between the sorption agent and the surrounding casing becomes especially important in using such sorption agents which swell under the action of certain solvents. In using such a sorption agent one has not been able, while sticking to the requirement of straight fronts, to displace a liquid, exercising a strong swelling effect upon the sorption agent, by means of a liquid which exercises a less strong swelling effect, as the shrinking of the column occurring in this operation has caused the liquid to flow faster at the wall of the casing than inside the column.

Such swelling and shrinking sorption agents are, for instance, ion exchange materials and paper. Paper columns may be produced of a filter paper strip being wound upon a core to form a cylinder which is forced into a cylindrical casing. When the paper becomes wet it swells, and unfortunately it does not swell completely reversibly, so that displacing the water with alcohol involves such a shrinking that an area having too low a flow resistance is formed at the wall of the casing.

Said swelling and shrinking has confined the choice of the solvents to be used due to the fact that in carrying through a separation process one has been constrained to use solvents having generally the same swelling effect upon the sorption agent. The present invention relates to a device which enables iso-porosity to be maintained in the sorption agent column and which particularly permits a swelling of the sorption agent to take place within wide limits while retaining the requirement of a straight front. The device according to the invention is characterized in that the liquid-tight casing is adapted to be resiliently pressed against the sorption agent. In using such sorption agents which swell and shrink, this pressure should be substantially independent of such variations of the column diameter which are dependent on the swelling and shrinking of the sorption agent under the action of the liquid flowing through.

According to one embodiment of the invention, the liquid-tight casing surrounding the sorption agent column may be surrounded by or consist of a flexible casing, for instance of rubber. This flexible casing must then be stretched around the column in such a way that it exerts the necessary pressure on the periphery of the column. The resilient casing may be applied, for instance, by a rubber strip being wound with an even pressure round the column. If the rubber is resilient enough, it may cover variations of the column diameter with no great changes occurring in the pressure upon the periphery.

Another embodiment, which permits the pressure on the periphery of the column to be maintained, is characterized in that the periphery of the column is surrounded by a closed space in which a pressure medium, such as a gas or a liquid, may be introduced, said pressure medium having a predetermined pressure. The pressure may then be controlled as desired in response to the solvents used.

According to a modification of the invention the pressure is not applied to the external periphery of the sorption agent but in a cavity within the sorption agent column. This embodiment is of special interest in such columns where the sorption agent consists of a paper strip coiled upon a core. The core may then consist of a rigid tube, for instance of glass, in the wall of which one or more apertures are provided. A rubber tube is arranged round the rigid tube and outside the rubber tube a flexible plastic cover is disposed, and the paper strip is wound around this cover to form a cylinder which then is placed in a rigid outer casing. If a pressure medium is introduced into the interior of the rigid tube, the pressure medium passes through the apertures in the wall thereof and presses the rubber tube and the plastic cover against the inside of the cavity in the paper roll. As the paper in moist condition is moldable, the central cavity expands and compresses the roll so that its outer periphery will be pressed against the rigid outer casing. A proper engagement is thus obtained at the inner as well as at the outer boundary surface of the paper roll, which is a pre-requisite for a straight front to be obtained.

The invention will now be more fully described with reference to the attached drawing, wherein FIGURE 1 shows one embodiment of the device according to the invention, and FIGURE 2 shows a modification of the device according to the invention.

In the device according to FIG. 1, 1 denotes a column of a sorption agent in the form of a strip of filter paper wound to form a cylinder around a solid core 2 of metal, glass or some other suitable material which is resistant to the solvents used. The paper cylinder is enclosed in a flexible tube 3 of plastic or some other material resistant to the solvents, and the plastic tube is surrounded by a rubber tube 4. The described assembly is introduced into a metal cylinder 5, and both ends of the rubber tube are secured to tapered shoulders on the inner wall of the metal cylinder by means of rings 6 and 9 having tapered surfaces and being retained by threaded sleeves 7 and 10. For bridging the interspace between the paper cylinder and the inner wall of the metal cylinder, slide rings 8 and 11 are arranged having surfaces tapering towards the rubber tube and being held in place by friction against the sealing rings 6 and 9.

Liquid is introduced at the top through a pipe 12 and is gathered at the bottom by means of a funnel 13.

In the wall of the metal cylinder an opening is provided for an inlet pipe 14 for a gas or liquid under pressure, and preferably there is also provided an opening for a manometer 16 for indicating the pressure in the interspace 15 between the inner wall of the metal cylinder 5 and the paper column.

If a gas, such as air or nitrogen, is introduced through the pipe 14 to the space 15 and is maintained at constant pressure, the rubber tube 4 will press the plastic tube 3 against the periphery of the paper cylinder 1 with a pressure, which has the same magnitude at all points of the periphery. This pressure will also be substantially independent of the variations of the diameter of the paper roll which are dependent on the swelling and shrinking of the paper under the influence of various solvents, if there is a sufficient volume of gas in relation to the swelling volume. Thus it is possible to use as a solvent in one and the same separating operation alternatingly, for instance, water, alcohol and organic solvents immiscible with water and to obtain straight fronts all the time, in spite of the various swelling effects on paper of these solvents.

The pressure medium should be supplied in such a way that even great variations of the diameter of the sorption agent column do not cause any change in the pressure. In using a compressible pressure medium, for instance a gas, this may be attained, as previously mentioned, by the use of a sufficiently large volume of gas in relation to the swelling volume. Some kind of manostat may also be employed for maintaining constant pressure. For instance, a gas may simply be supplied from a compressed gas container provided with a reducing valve maintaining the desired pressure.

In FIG. 1 a few various appearances are depicted of the front of the liquid flowing through. A straight front 17 is obtained according to the invention if the space 15 is kept filled with a gas of suitable pressure. In the absence of such a pressure and when changing from a more swelling to a less swelling solvent, the flow resistance becomes too low both at the outer periphery of the paper roll and at the wall of the core 2, for which reason the front will appear according to the line 18. If, on the other hand, the gas pressure in the space 15 is too high, the flow resistance becomes too great at the outer periphery and adjacent the core, for which reason the front appears according to line 19.

FIG. 2 shows a modification of the device according to the invention. A paper strip is here wound to form a cylinder 21 upon a core 22, which consists of a tube, for instance of glass. The tube is provided with openings 23 in the wall. One end of the tube is air-tightly closed by means of a plug 27, and its opposite end is closed by a plug 28 provided with a supply tube 29 for compressed air. The tube 22 is surrounded by a rubber tube 24, whose ends are hermetically secured to the tube 22 by means of clamps 26. Outside the rubber tube a flexible tube 25 is disposed, which is made of a material resistant to the solvents, for instance plastic. The whole thing is enclosed in a rigid casing 30.

If a gas having a suitable pressure is introduced into the tube 22, the gas penetrates the apertures 23 and presses the rubber tube 24 and the plastic tube 25 against the inner wall of the paper cylinder 21. The paper is moldable to such an extent that the outer periphery of the paper cylinder will be pressed against the inside of the rigid casing 30 whereby the flow velocity will be the same all over the cross section area.

In using the devices according to FIGURES 1 and 2, the pressure employed should suitably be between 0.2 and 1.0 kg./cm.$^2$. In using paper as a sorption agent, the paper column will be too strongly deformed if the pressure amounts to more than about 2 kg./cm.$^2$. In chromatographic separations when using a device according to FIG. 1 with a paper roll of fast operating filter paper having a diameter of 80 mm. and changing between water and alcohol as solvents, it has been found advisable to maintain a pressure of about 0.6 kg./cm.$^2$. If changing between other solvents should require other pressures, the proper pressure will be easily found by investigating at what pressure a straight front is obtained. The devices according to FIGURES 1 and 2 also renders it possible to vary the pressure in a simple way in the course of the separation, if this should be necessary.

What is claimed is:
1. Apparatus for separating a dissolved substance from a liquid comprising a vertically disposed rigid cylindrical tube having an imperforate wall, a rigid core axially disposed within said tube, a tubular cylindrical column of sorption agent consisting of a permeable sheet material rolled up into cylindrical form positioned between said cylindrical tube and said rigid core and coaxial therewith, said column having inner and outer cylindrical surfaces, an imperforate elastic tube positioned concentric with and adjacent to and covering one of said cylindrical surfaces of said column, means for supplying liquid containing dissolved substance to the top of said column, means for withdrawing liquid from the bottom of said column and means for supplying a fluid under pressure to the surface of said elastic tube remote from said last named cylindrical surface while liquid is being passed longitudinally through to said column in order to apply pressure to said column whereby uniform lateral pressure would be applied to said column while the liquid to be filtered passes longitudinally through said column.

2. Apparatus as defined in claim 1 in which said elastic tube surrounds the outer cylindrical surface of said column and is positioned between said column and said rigid casing and the means for applying fluid pressure to said elastic tube comprises an opening in said rigid casing.

3. Apparatus as defined in claim 1 in which said elastic tube is positioned between said rigid core and said column and said means for applying fluid pressure to said elastic tube comprises a passageway in said core.

4. Apparatus as defined in claim 1 comprising a flexible, fluid tight tube positioned between said column and said elastic tube.

References Cited in the file of this patent

UNITED STATES PATENTS

| | | |
|---|---|---|
| 817,252 | Kneuper | Apr. 10, 1906 |
| 2,365,766 | Levier | Dec. 26, 1944 |
| 2,709,496 | Baker | May 31, 1955 |